March 4, 1969  R. W. BOSSE  3,430,531

SELF-TAPPING INSERT

Filed Oct. 21, 1966

INVENTOR
ROBERT W. BOSSE

BY *Arthur B Colvin*
ATTORNEY

United States Patent Office 3,430,531
Patented Mar. 4, 1969

3,430,531
SELF-TAPPING INSERT
Robert W. Bosse, Englewood Cliffs, N.J., assignor to Groov-Pin Corporation, Ridgefield, N.J., a corporation of New York
Filed Oct. 21, 1966, Ser. No. 588,392
U.S. Cl. 85—47      2 Claims
Int. Cl. F16b *33/02, 33/06, 25/00*

ABSTRACT OF THE DISCLOSURE

This invention relates to the art of self-tapping inserts and more particularly to an insert adapted to self-tap screw threads into brittle material into which it is to be anchored comprising a cylindrical sleeve having an axial bore therethrough with an internally threaded surface and having an external surface formed with helically extending lower and upper tapping threads with seating threads intervening between said tapping threads, the sleeve having thread cutting interruptions near each end extending through the associated tapping threads.

---

As conducive to an understanding of the invention it is noted that self-tapping metal inserts have been provided which tap a threaded seat in a bore in the base material into which the insert is driven in order to retain the insert in such bore.

Such insert is generally used where it is desired to removably attach one member to a second member of relatively brittle material such as Bakelite, since the threads made directly in such material would be likely to strip if tension was applied against a screw for example, directly coacting with threads in the brittle material.

As the insert is rotated and driven into a bore in the base material, a cutting action will take place provided by the cutting interruptions in the insert. As the bore opening is of smaller diameter than the diameter of the insert, the material defining the periphery of said bore will be placed under tension as the insert is driven into the bore. Although the cutting action effected by the insert will remove base material to form the threads in the bore, since the thread segments between cutting interruptions are not radially relieved, as in the case of a tap, due to the lack of resilience of the brittle base material which is under tension, radial forces will be exerted between the external threads of the insert and the base material.

Such radial forces will progressively build up and will reach a point such as to cause cracking of the base material at its weakest point, i.e., at the mouth of the bore.

These radial forces are beneficial in that they provide a frictional lock of the insert in the base material. However, this beneficial action is counteracted by the fact that in many materials and particularly brittle materials such as Bakelite, progressive build up of such radial forces will cause cracking of the base material at the mouth of the bore.

It is accordingly among the objects of the invention to provide a self-tapping insert which may readily be fabricated with substantially the same equipment used to manufacture a conventional self-tapping insert, and which will automatically reduce the radial forces occurring at the mouth of the bore in which the insert is driven thereby preventing cracking of the base material at the mouth of such bore.

According to the invention, these objects are accomplished by the arrangement and combination of elements hereinafter described and more particularly recited in the claims.

Figure 1:
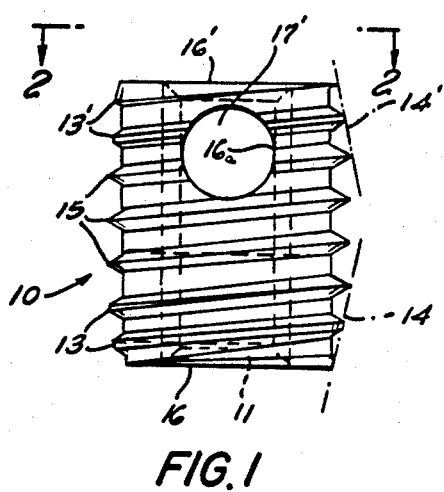
Figure 2:
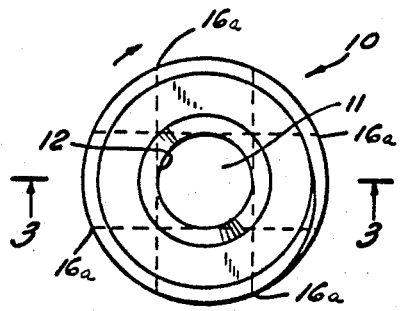
Figure 3:
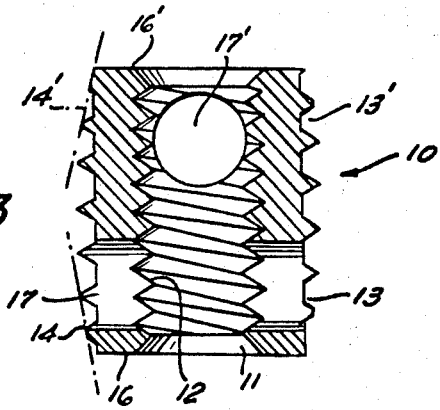
Figure 4:
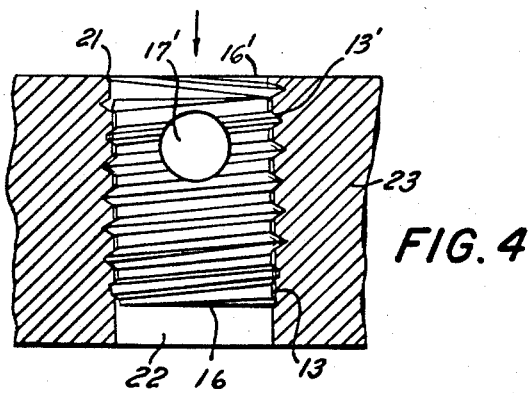

In the accompanying drawings in which is shown one of various possible embodiments of the several features of the invention:

FIG. 1 is a side elevational view of one embodiment of a self-tapping threaded insert made in accordance with the invention, FIG. 2 is a top plan view taken along line 2—2 of FIG. 1, FIG. 3 is a sectional view taken along line 3—3 of FIG. 2, and FIG. 4 is a view similar to FIG. 1 showing the insert in driven position in a bore in the base material.

Referring now to the drawings, the insert 10 comprises a cylindrical body or sleeve having an axial passageway or bore 11 therethrough provided with an internally threaded surface 12 adapted to be engaged by a conventional fastening member such as a machine screw or the like.

The insert can be made of any material of hardness sufficiently greater than the base material into which it is threaded, effectively to cut its own threads therein.

Preferably, the inserts are of steel which may be case hardened or not depending upon the base material.

The external surface of the insert 10 is formed with lower and upper tapping threads 13, 13' extending helically about the exterior chamfered end surfaces 14, 14' of the insert and seating threads 15.

Cutting action is effected by the sharp edge 16a formed at the outer periphery of each of the interruptions 17 in the tapping threads on the outer surface of the insert, which do not extend to the free end of the insert, but are spaced therefrom slightly to leave the entry ends 16, 16' of the insert uninterrupted or intact.

The interruption is of length longitudinally of the insert to extend at its inner end past the tapered or chamfered threaded sections 14, 14' somewhat into the unchamfered threaded section 15.

While each thread cutting interruption 17 may be a depression machined or rolled across the external threads 14, 14', it is preferred that such interruptions be an aperture or opening clear through the wall of the insert because such aperture contributes to ease of discharge of the chips cut in the self-tapping operation.

In the conventional self-tapping insert of the type shown and described, the cutting edge 16a is formed by drilling a set of transversely extending openings 17 through the insert body into the bore thereof adjacent one end 16 of the insert.

According to the invention, additional cutting action is provided adjacent the other end 16' of the insert by drilling a set of transversely extending openings 17' adjacent such other end, each illustratively spaced 90 degrees from the openings 17 of the first set.

By reason of this construction, with the end 16 of the insert positioned in the mouth 21 of bore 22 of the base material 23, when the insert is rotated in conventional manner in a clockwise direction, the cutting edges 16a which extend through and sever the tapping threads 13, will provide a tapping action and cut threads into the bore 22 from the mouth 21 thereof inwardly.

As previously noted, although the cutting action of the edges 16a defined by the holes 17 through the threads 13 will remove base material to form the threads in the bore, due to the fact that the base material is under tension since the thread segments between adjacent holes 17 are not relieved, a radial force will be exerted between the external threads of the insert 10 and the base material.

When the insert first enters the bore 22, the radial forces will only be those resulting from say, the first thread of the insert. However, as the insert is progressively driven into the bore 22, and more and more threads of the insert enter the bore, the radial forces will progressively build up. However, before such radial forces can build up to a point sufficient to cause cracking of the brittle base material at the mouth of the bore, the cross holes 17' of the insert will remove a small portion of the base material adjacent the mouth of the bore 22 by shaving away minute amounts of the previously cut but relatively highly stressed threads of the base material, to relieve the radial forces adjacent the mouth of the bore only, thereby preventing cracking and failure of such base material.

Thus, the insert provides a thread cutting action which results in the frictional lock between the insert and the base material, but also relieves the radial stress in the weakest area of the base material, i.e., adjacent the mouth of the bore by removing a portion of the stressed threads.

As many changes could be made in the above article, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A self-tapping insert for installation in an opening formed in a material relatively softer than the material of said insert, said insert comprising an elongated substantially cylindrical body member having a central threaded bore therethrough extending longitudinally thereof releasably to accommodate a threaded member, said body member having a threaded exterior surface with tapping threads formed at both ends thereof, the threads between such tapping threads forming seating threads to retain the insert in such material, said tapping threads having a substantially flat crest portion with the height of the threads gradually diminishing from the ends of said seating threads toward each end of the body member, said body member having thread cutting interruptions near each end thereof extending through the associated tapping threads, each of said thread cutting interruptions comprising a circular aperture extending through the tapping threads and slightly into the adjacent seating threads into said threaded bore, the severed ends of the threads at the outer periphery of each of said apertures defining cutting edges.

2. A self-tapping insert for installation in an opening formed in a material relatively softer than the material of said insert, said insert comprising an elongated substantially cylindrical body member having a central threaded bore therethrough extending longitudinally thereof releasably to accommodate a threaded member, said body member having a threaded exterior surface with tapping threads formed at both ends thereof, the threads between such tapping threads forming seating threads to retain the insert in such material, said tapping threads having a substantially flat crest portion with the height of the threads gradually diminishing from the ends of said seating threads toward each end of the body member, said body member having thread cutting interruptions near each thereof extending through the associated tapping threads, said thread cutting interruptions comprising transversely aligned circular openings extending through the tapping threads and slightly into the adjacent seating threads into said threaded bore, the openings at one end of the body member being displaced 90 degrees with respect to the openings at the other end of the body member.

References Cited

UNITED STATES PATENTS

| 2,527,294 | 10/1950 | Bailey | 85—47 |
| 2,795,221 | 6/1957 | Braendel | 85—47 |
| 2,922,455 | 1/1960 | Braendel | 85—47 |
| 3,260,150 | 7/1966 | Colman | 85—47 |

FOREIGN PATENTS

| 843,129 | 8/1960 | Great Britain. |

EDWARD C. ALLEN, *Primary Examiner.*